A. E. D'HARLINGUE.
BLOWN GLASS VACUUM BRICK.
APPLICATION FILED NOV. 23, 1918.
1,342,404.
Patented June 1, 1920.
2 SHEETS—SHEET 1.
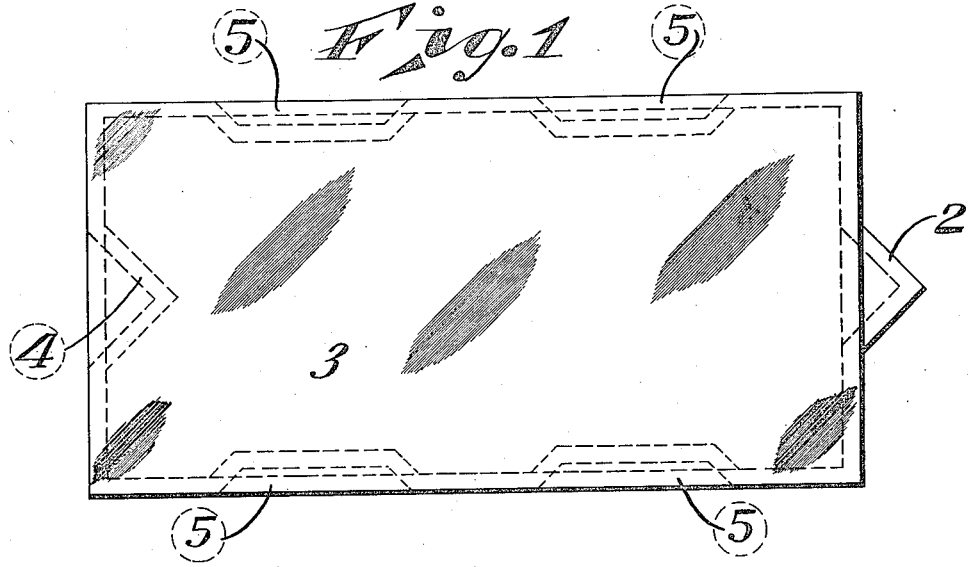
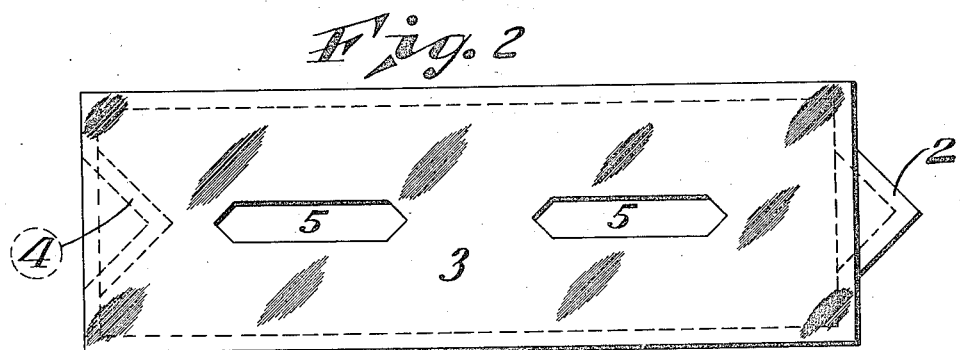
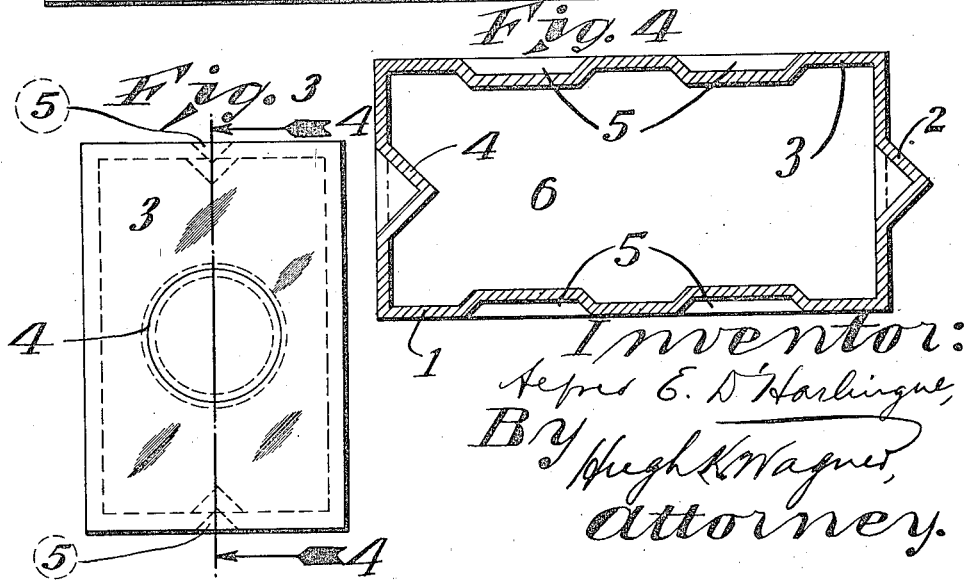
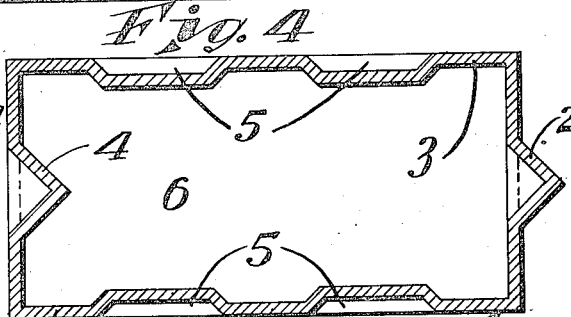
Inventor:
Aspire E. D'Harlingue,
By Hugh K. Wagner,
Attorney.

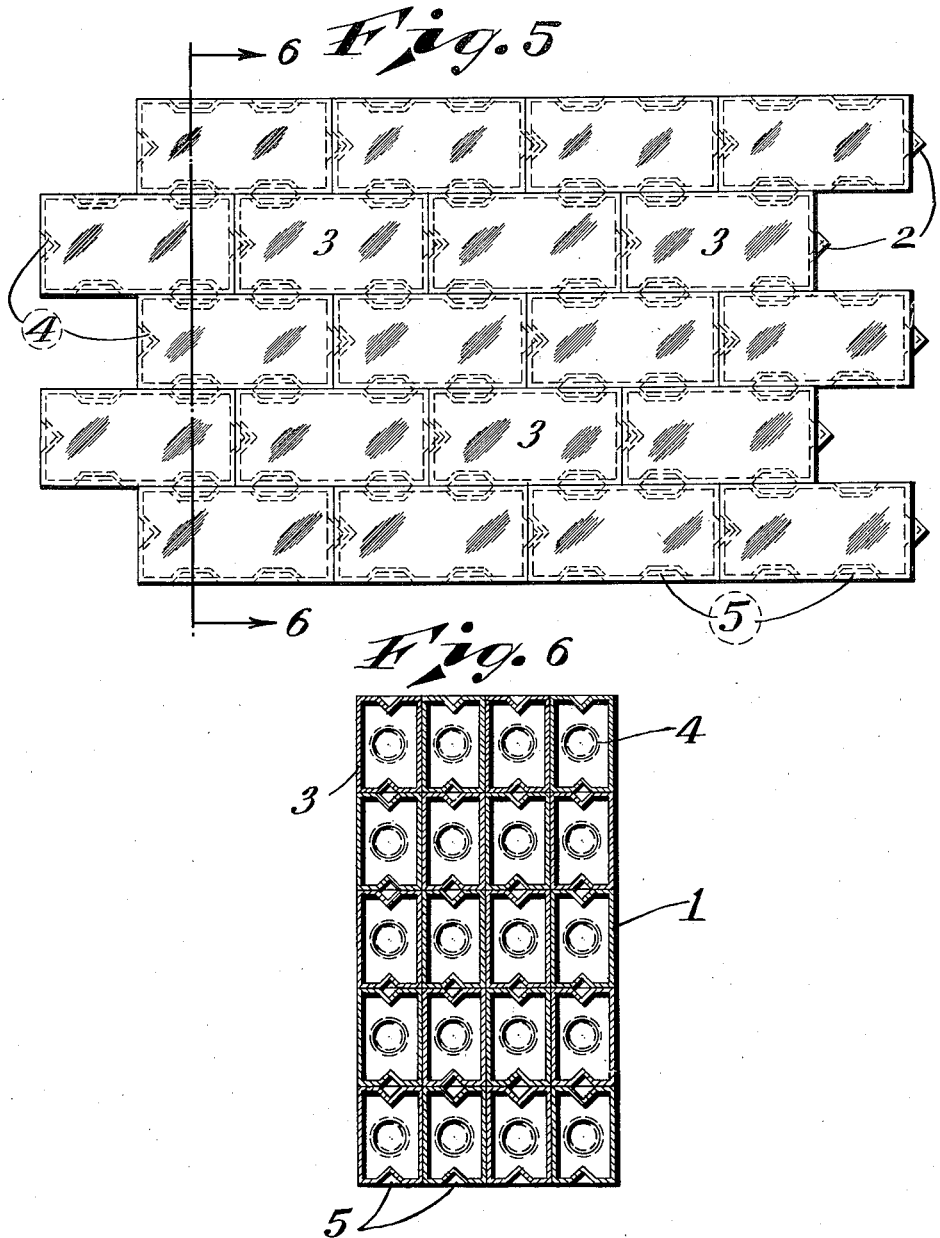

UNITED STATES PATENT OFFICE.

ALFRED E. D'HARLINGUE, OF ST. LOUIS, MISSOURI.

BLOWN-GLASS VACUUM-BRICK.

1,342,404.  Specification of Letters Patent.  Patented June 1, 1920.

Application filed November 23, 1918. Serial No. 263,907.

*To all whom it may concern:*

Be it known that I, ALFRED E. D'HAR-LINGUE, a citizen of the United States, residing at the city of St. Louis, in the State of Missouri, have invented certain new and useful Improvements in Blown-Glass Vacuum-Bricks, of which the following is a specification.

This invention consists of a blown-glass brick containing a vacuum and hermetically sealed at the point of detachment of the blower. The primary object of this invention is to provide bricks of this character for insulation purposes, but, in conjunction therewith, the additional advantages, procured from the use of glass, that the same can be made either transparent or translucent. The glass can be of any color, and thus these bricks can be made opaque if desired. These bricks may be of any desired shape or size, and may have a corrugated surface so as to prevent vision therethrough. Preferably, they are provided with mortises and tenons and mortar pockets on their surfaces so as to form a strong wall or the like when combined to form such a structure.

They can be used for various purposes, among which may be mentioned, by way of illustration, but not enumeration, lining incubators and brooders; incasing liquid air reservoirs and pipes; lining fireless cookers; lining ice boxes, refrigerators, refrigerating and cold storage rooms, refrigerator cars, electric ovens, and bakers' proof boxes; in lieu of window panes; in walls of buildings where lighting is needed and there are no windows; in hot-houses and gardeners' hot-beds; in any place where a light-weight insulation brick is desired; in any place where non-hygroscopic material that will allow the penetration of light through it is desired; in any place where transparent or translucent material that will not permit the passage of heat or cold is desirable; and, in any place where a vacuum container having thin walls is suitable or necessary.

In the accompanying drawings forming part of this specification, in which like numbers of reference denote like parts wherever they occur, Figure 1 is a side elevation;

Fig. 2 is a top plan view;

Fig. 3 is an end elevation;

Fig. 4 is a sectional view to show the hollow interior;

Fig. 5 illustrates a wall constructed of these bricks; and

Fig. 6 is a sectional view on the line 6—6 in Fig. 5.

The walls 1 may be of any desired thickness or thinness, proportioned to the area of the wall and depending upon the temperatures to which the same will be subjected and the uses for which intended. When the brick is blown, the blow-pipe will be attached at 2, and, when detached, a vacuum will be formed therethrough. The glass remaining at that point will be shaped into the tenon 2 at, for instance, the right-hand end of Figs. 1 and 2, whereby the vacuum will be hermetically sealed. At the opposite end of the brick 3, a mortise 4 is formed to receive a tenon 2 upon an adjacent brick, as shown in the wall formation depicted in Fig. 5. Mortar or cement will preferably be inserted between each tenon 2 and its mortise 4, thus binding adjoining bricks together, but mortar may or may not be used throughout the adjoining surfaces of bricks in a wall. Each brick is, however, preferably provided with a mortar pocket 5 in which mortar or cement will be inserted. These pockets will preferably be opposite each other, as shown in Fig. 5, so that the mass of mortar or cement will extend from within one brick into a neighboring brick, thus strengthening the wall. The hollow 6 within each brick is a complete vacuum. The vacuum is created through the tenon or sealed tip 2. The mortises and tenons 2 and 4 and the mortar or cement pockets 5 can be placed at any desired point on the surface of the bricks. The shape of these features is immaterial, as they may be either square, round, diamond-shaped, or of any other contour. These bricks may be either frosted or ornamented.

The larger the brick, the greater the surface of resistance and the less the conductive area. It will be readily understood that a wall thus constructed will retain heat or cold in the space inclosed thereby, and, vice versa, will exclude either heat or cold.

Having thus described this invention, I hereby reserve the benefit of all changes in form, arrangement, order, or use of parts, as may fall within the scope of the following claim, as it is evident that many minor changes may be made therein without departing from the spirit of this invention.

It will be observed that the brick is rectangular in general outline, and that the individual bricks each have a tapered circular mortise at one end and a tapered circular tenon at the opposite end, causing the bricks to fit closely together while longitudinal mortar pockets are formed on two faces of each brick insuring the reception of an ample amount of mortar to retain the bricks and disposing the bricks in intimate relation to provide a smooth, ornamental and durable structure.

I claim:

As a new article of manufacture, a blown glass brick of rectangular form having a tapered circular tenon at one end, a tapered circular pocket at its other end and having in its upper and lower walls longitudinally-extending mortar-receiving pockets that are relatively small in proportion to the contact surface between the upper and lower surfaces of abutting blocks, whereby a much larger amount of transparent surface is obtained than the surface covered by the mortar.

In testimony whereof I hereunto affix my signature.

ALFRED E. D'HARLINGUE.